(12) United States Patent
Keskin

(10) Patent No.: US 12,493,999 B2
(45) Date of Patent: Dec. 9, 2025

(54) CONTENT MODIFICATION FOR IMPROVING USER SAFETY

(71) Applicant: QUALCOMM Incorporated, San Diego, CA (US)

(72) Inventor: Mustafa Keskin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 230 days.

(21) Appl. No.: 18/322,952

(22) Filed: May 24, 2023

(65) Prior Publication Data

US 2024/0394930 A1     Nov. 28, 2024

(51) Int. Cl.
| | |
|---|---|
| G06T 11/00 | (2006.01) |
| G01S 13/75 | (2006.01) |
| G01S 13/89 | (2006.01) |
| H04W 4/021 | (2018.01) |

(52) U.S. Cl.
CPC .............. *G06T 11/00* (2013.01); *G01S 13/75* (2013.01); *G01S 13/89* (2013.01); *H04W 4/021* (2013.01)

(58) Field of Classification Search
CPC .......... G06T 11/00; G01S 13/75; G01S 13/89; H04W 4/021
See application file for complete search history.

(56) References Cited

U.S. PATENT DOCUMENTS

| | | | | |
|---|---|---|---|---|
| 2016/0110593 | A1* | 4/2016 | Hoof | G06F 3/005 |
| | | | | 382/103 |
| 2019/0043259 | A1* | 2/2019 | Wang | G06F 3/012 |
| 2020/0038755 | A1* | 2/2020 | Kojima | A63F 13/57 |
| 2021/0283503 | A1 | 9/2021 | Challinor | |
| 2022/0254119 | A1* | 8/2022 | Berliner | G06T 19/20 |
| 2022/0358733 | A1* | 11/2022 | Velasquez | G01C 21/387 |
| 2023/0239832 | A1* | 7/2023 | Colonna | H04W 68/005 |
| | | | | 455/456.1 |
| 2024/0012491 | A1 | 1/2024 | Torres et al. | |

FOREIGN PATENT DOCUMENTS

WO     2022135685 A1     6/2022

OTHER PUBLICATIONS

International Search Report and Written Opinion—PCT/US2024/024063—ISA/EPO—Jul. 19, 2024.

* cited by examiner

*Primary Examiner* — Yu Chen
(74) *Attorney, Agent, or Firm* — QUALCOMM Incorporated

(57) ABSTRACT

In some aspects, a user equipment (UE) may identify a boundary for interacting with content. The UE may determine a center of gravity within the boundary for interacting with the content. The UE may modify the content in accordance with the center of gravity. Numerous other aspects are described.

30 Claims, 9 Drawing Sheets

CONTENT MODIFICATION FOR IMPROVING USER SAFETY

FIELD OF THE DISCLOSURE

Aspects of the present disclosure generally relate to content interaction and, for example, to content modification for improving user safety.

BACKGROUND

Wireless communication systems are widely deployed to provide various telecommunication services such as telephony, video, data, messaging, and broadcasts. Wireless communication systems may employ multiple-access technologies capable of supporting communication with multiple users by sharing available system resources (e.g., bandwidth, transmit power, or the like). A wireless network may include one or more network nodes that support communication, for example, between the network node and a user equipment (UE). A UE may be configured to display content, such as extended reality content, virtual reality content, augmented reality content, social media content, and/or gaming content, among other examples, to a user of the UE. In one example, the UE may be a headset or other device capable of displaying the content to the user. This may cause the user of the UE to become disconnected from reality, for example, since the user may only be able to see or hear what is occurring in the virtual environment.

SUMMARY

Some aspects described herein relate to a method of wireless communication performed by a user equipment (UE). The method may include identifying a boundary for interacting with content. The method may include determining a center of gravity within the boundary for interacting with the content. The method may include modifying the content in accordance with the center of gravity.

Some aspects described herein relate to a method of wireless communication performed by a UE. The method may include identifying a boundary for interacting with content. The method may include receiving, from another device, an input associated with the boundary for interacting with the content. The method may include modifying the content in accordance with the input.

Some aspects described herein relate to a method of wireless communication performed by a UE. The method may include identifying a boundary for interacting with content. The method may include generating a heat map associated with the boundary for interacting with the content. The method may include modifying the content in accordance with the heat map.

Some aspects described herein relate to a UE for wireless communication. The UE may include one or more memories and one or more processors coupled to the one or more memories. The one or more processors may be configured to identify a boundary for interacting with content. The one or more processors may be configured to determine a center of gravity within the boundary for interacting with the content. The one or more processors may be configured to modify the content in accordance with the center of gravity.

Some aspects described herein relate to a UE for wireless communication. The UE may include one or more memories and one or more processors coupled to the one or more memories. The one or more processors may be configured to identify a boundary for interacting with content. The one or more processors may be configured to receive, from another device, an input associated with the boundary for interacting with the content. The one or more processors may be configured to modify the content in accordance with the input.

Some aspects described herein relate to a UE for wireless communication. The UE may include one or more memories and one or more processors coupled to the one or more memories. The one or more processors may be configured to identify a boundary for interacting with content. The one or more processors may be configured to generate a heat map associated with the boundary for interacting with the content. The one or more processors may be configured to modify the content in accordance with the heat map.

Some aspects described herein relate to a non-transitory computer-readable medium that stores a set of instructions by a UE. The set of instructions, when executed by one or more processors of the UE, may cause the UE to identify a boundary for interacting with content. The set of instructions, when executed by one or more processors of the UE, may cause the UE to determine a center of gravity within the boundary for interacting with the content. The set of instructions, when executed by one or more processors of the UE, may cause the UE to modify the content in accordance with the center of gravity.

Some aspects described herein relate to a non-transitory computer-readable medium that stores a set of instructions by a UE. The set of instructions, when executed by one or more processors of the UE, may cause the UE to identify a boundary for interacting with content. The set of instructions, when executed by one or more processors of the UE, may cause the UE to receive, from another device, an input associated with the boundary for interacting with the content. The set of instructions, when executed by one or more processors of the UE, may cause the UE to modify the content in accordance with the input.

Some aspects described herein relate to a non-transitory computer-readable medium that stores a set of instructions by a UE. The set of instructions, when executed by one or more processors of the UE, may cause the UE to identify a boundary for interacting with content. The set of instructions, when executed by one or more processors of the UE, may cause the UE to generate a heat map associated with the boundary for interacting with the content. The set of instructions, when executed by one or more processors of the UE, may cause the UE to modify the content in accordance with the heat map.

Some aspects described herein relate to an apparatus. The apparatus may include means for identifying a boundary for interacting with content. The apparatus may include means for determining a center of gravity within the boundary for interacting with the content. The apparatus may include means for modifying the content in accordance with the center of gravity.

Some aspects described herein relate to an apparatus. The apparatus may include means for identifying a boundary for interacting with content. The apparatus may include means for receiving, from another device, an input associated with the boundary for interacting with the content. The apparatus may include means for modifying the content in accordance with the input.

Some aspects described herein relate to an apparatus. The apparatus may include means for identifying a boundary for interacting with content. The apparatus may include means for generating a heat map associated with the boundary for interacting with the content. The apparatus may include means for modifying the content in accordance with the heat map.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
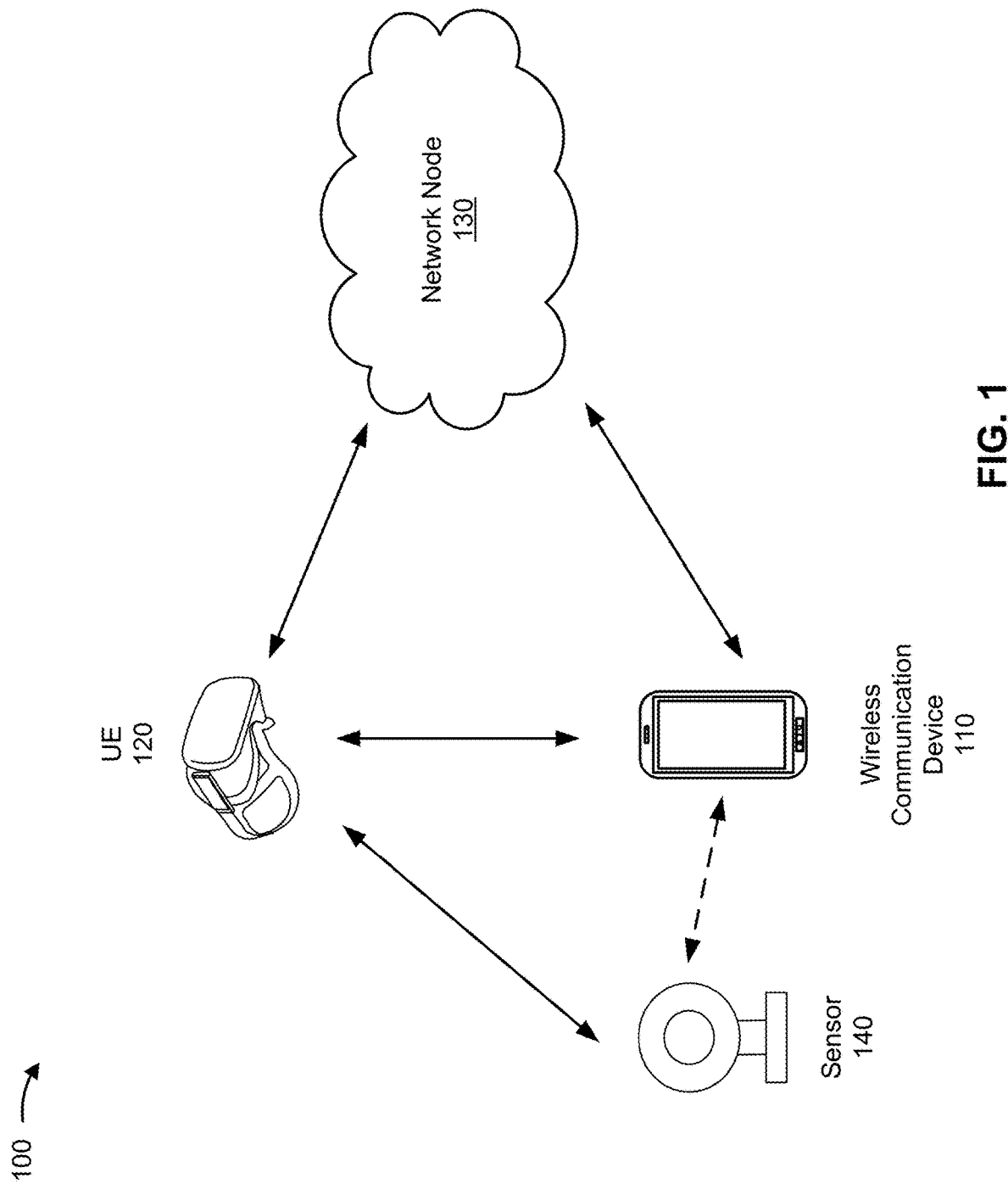
FIG. 1 is a diagram of an example environment in which systems and/or methods described herein may be implemented.

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

A user equipment (UE) may be, may include, or may be included in a headset, a cellular phone, a tablet, or a gaming device, among other examples. The UE may be configured to display content via a display associated with the UE. The display may be included in the UE or may be otherwise connected to the UE. The content may be extended reality (XR) content, virtual reality (VR) content, augmented reality (AR) content, mixed reality (MR) content, video content, gaming content, social media content, or communication content, among other examples. The content may cause a user of the UE to become disconnected from reality, which may result in injuries to the user and/or damage to items or property in the surrounding environment of the user. In the example where the UE is a headset and the content is virtual reality content, the user may move around in the environment while interacting with the content, and may not be able to see objects in the environment that are capable of being damaged or causing harm to the user. In some cases, the UE may display a virtual boundary and may prevent the user of the UE from leaving the virtual boundary. For example, the content may pause if the user leaves the boundary and may display a message for the user to re-enter the boundary to resume interacting with the content. However, the content may not otherwise encourage the user to remain within the boundary. Additionally, the UE may not be able to distinguish between certain portions of the boundary associated with higher levels of danger and more expensive items in the environment, and other portions of the boundary associated with lower levels of danger or less expensive items in the environment. This may increase a likelihood of injury to the user or damage to items or property in the surrounding environment.

Various aspects relate generally to content interaction. Some aspects more specifically relate to content modification for improving user safety. A UE may identify a virtual boundary for interacting with content, such as extended reality content, and may modify the content to reduce a likelihood of injury to a user of the UE and to prevent damage to items or property in the surrounding environment of the user of the UE. In some examples, the UE may identify a center of gravity within the boundary, and may modify the content in accordance with the center of gravity. For example, the content may be modified to encourage a user to move toward a center location of the boundary, such as using incremental movements. In some examples, the UE may receive an input from another device, and may modify the content in accordance with the input. The other device may be a passive tag, and the input may be a radio frequency identification (RFID) signal, a distance measurement, or an echo indication. Additionally, or alternatively, the other device may be a radar-enabled device, and the input may be a radar signal. The other device may be located in, on, or near an area or object associated with a higher level of danger. In some examples, a contour map may be used to indicate one or more safety levels. For example, a first contour, such as a contour that is near the center of gravity, may be associated with a higher level of safety, and a second contour, such as a contour that is further away from the center of gravity and/or closer to the other device, may be associated with a lower level of safety. In some examples, the UE may generate a heat map associated with the content interaction, and may modify the content in accordance with the heat map. The heat map may indicate a first portion of the boundary or a first object associated with a higher level of safety, and/or may indicate a second portion of the boundary or a second object associated with a lower level of safety. The heat map may use different colors, shapes, depths, or dimensions, among other examples, to distinguish between different portions of the boundary or objects in the environment having different levels of safety.

Particular aspects of the subject matter described in this disclosure can be implemented to realize one or more of the following potential advantages. In some examples, the described techniques can be used to reduce a likelihood of injury to a user of a UE and/or to reduce a likelihood of damage to items or property in an environment associated with the user of the UE. In some examples, the content may be modified to encourage a user to move toward a center of gravity where the likelihood of injury or damage is reduced, as compared with the likelihood of injury or damage closer to the edge portions of the boundary. In some examples, the content may be modified to encourage the user to move away from dangerous or expensive objects in accordance with the input received from the other device. In some examples, the content may be modified to encourage the user to move toward a portion of the heat map associated with a higher level of safety and away from another portion of the heat map associated with a lower level of safety. In some examples, the user may enjoy an uninterrupted user experience and seamless adaptive content delivery with user-location tracking may be enabled. These examples, among others described herein, increase user safety and reduce a likelihood of damage to items or property while the user is interacting with content.

FIG. 1 is a diagram of an example environment 100 in which systems and/or methods described herein may be implemented. As shown in FIG. 1, the environment 100 may include a wireless communication device 110, a UE 120, a network node 130, and a sensor 140. The wireless communication device 110 and the network node 130 may communicate. Additionally, or alternatively, the UE 120 and the network node 130 may communicate. In some cases, the UE 120 and the wireless communication device 110 may communicate via a direct connection. In some other cases, the UE 120 and the wireless communication device 110 may communicate via the network node 130. The UE 120 may be an XR device, such as a VR device, an AR device, or an MR device, among other examples. In some cases, the UE 120 and the wireless communication device 110 may be included in a single device. For example, the UE 120 May be included in the wireless communication device 110, or the wireless communication device 110 may be included in the UE 120. In some other cases, the UE 120 and the wireless communication device 110 may be separate devices.

A network, such as a network that includes the network node 130, may include one or more wired networks, one or more wireless networks, or a combination thereof. A wireless network may be or may include elements of a 3G network, a 4G network, a 5G (New Radio (NR)) network, a Long Term Evolution (LTE) network, and/or a 6G network, among other examples. In some aspects, the network node 130 may be a base station (a Node B, a gNB, and/or a 5G node B (NB), among other examples), a relay device, a network controller, an access point, a transmit receive point (TRP), an apparatus, a device, a computing system, one or more components of any of these, and/or another processing entity configured to perform one or more aspects of the techniques described herein. For example, the network node 130 may be an aggregated base station and/or one or more components of a disaggregated base station.

The UE 120 may be a stationary device or a mobile device. In some cases, the UE 120 may be a display device or may include a display device, such as a virtual reality headset or a screen associated with a cellular phone, a tablet, or a gaming device. The UE 120 may be, may include, or may be included in a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, a radar device, or any other suitable device that is configured to communicate via a wireless or wired medium.

The wireless communication device 110 may be a stationary device or a mobile device. In some cases, the wireless communication device 110 may communicate with the network node 130, for example, to receive content from the network node 130. Additionally, or alternatively, the wireless communication device 110 may communicate with the UE 120, for example, to transmit the content to the UE 120. In some cases, as described above, the UE 120 and the wireless communication device 110 may be a single device or may be included in a single device. The wireless communication device 110 may be, may include, or may be included in a cellular phone (e.g., a smart phone), a personal digital assistant (PDA), a wireless modem, a handheld device, a laptop computer, a cordless phone, a wireless local loop (WLL) station, a tablet, a camera, a gaming device, a netbook, a smartbook, an ultrabook, a medical device or equipment, biometric sensors/devices, an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some wireless communication devices, such as the wireless communication device 110 and/or the UE 120, may be machine-type communication (MTC) or evolved or enhanced machine-type communication (eMTC) UEs. MTC and eMTC wireless communication devices include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some wireless communication devices may be Internet-of-Things (IoT) devices, and/or may be implemented as NB-IoT (narrowband internet of things) devices. Some wireless communication devices may be Customer Premises Equipment (CPE). A wireless communication device may be included inside a housing that houses components of the wireless communication device, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

The sensor 140 may be configured to sense data and to transmit a signal that includes or indicates the sensed data. In an example where the UE 120 and the wireless communication device 110 are included in a single device, the sensor 140 may be located externally to the device and may transmit the signal that includes or indicates the data to the device. In an example where the UE 120 and the wireless communication device 110 are separate devices, the sensor 140 may be located externally to the UE 120 and the wireless communication device 110 and may transmit the signal that includes or indicates the data to the UE 120 and/or the wireless communication device 110. Alternatively, the sensor 140 may be located within the wireless communication device 110, and the wireless communication device 110 may transmit the signal that includes or indicates the data to the UE 120.

In some cases, the sensor 140 may be a passive device, such as a radio frequency identification (RFID) tag, and the signal may be an RFID signal, a distance measurement, or an echo indication. RFID is a technology that uses radio waves to identify and track objects. An RFID signal may include a tag, which may be attached to an object that is being tracked, and a reader, which may send a signal to the tag and receive a response. In some cases, the tag may include a microchip that stores information associated with the object and can be read by the reader when the tag is within a certain distance of the reader. In some cases, the tag may be, or may include, a distance measurement sensor configured to transmit one or more distance measurements. The distance measurement sensor may be a laser-based distance measurement sensor, an infrared-based distance measurement sensor, or an ultrasound-based distance measurement sensor, among other examples.

In some cases, the sensor 140 may be a radar-enabled device, and the signal may be a radar signal. Radar is a type of technology that uses radio detection and ranging (radar) waves to detect and locate objects. A radio wave may be transmitted by an antenna and may travel through a medium (such as air) until the radio wave bounces off an object. When the radio wave bounces off the object, a portion of the energy associated with the radar wave may be reflected back to a receiver. A device (such as the UE 120 and/or the wireless communication device 110) may be able to determine a distance or location of the object based at least in part on a time between the transmission of the radar signal and the reception of the reflected signal. Additionally, the device may be configured to analyze one or more properties of the reflected wave, such as a frequency or a pulse, to determine information about the size, shape, and/or motion of the object, among other examples. In some examples, the radar may be pulse radar. Pulse radar is a type of radar that includes transmission and reception of short, high-powered pulses of radio waves. In some other examples, the radar may be frequency modulated continuous wave (FMCW) radar. FMCW radar is a type of radar that includes transmission and reception of a continuous wave signal that varies in frequency over time.

The number and arrangement of devices and components shown in FIG. 1 are provided as one or more examples. In practice, there may be additional devices and/or components, fewer devices and/or components, different devices and/or components, or differently arranged devices and/or components than those shown in FIG. 1. Furthermore, two or more devices and/or components shown in FIG. 1 may be implemented within a single device, or a single device and/or component shown in FIG. 1 may be implemented as multiple, distributed devices. Additionally, or alternatively, a set of devices and/or components (e.g., one or more devices and/or components) of environment 100 may perform one or more functions described as being performed by another set of devices and/or components of environment 100.

Figure 2:
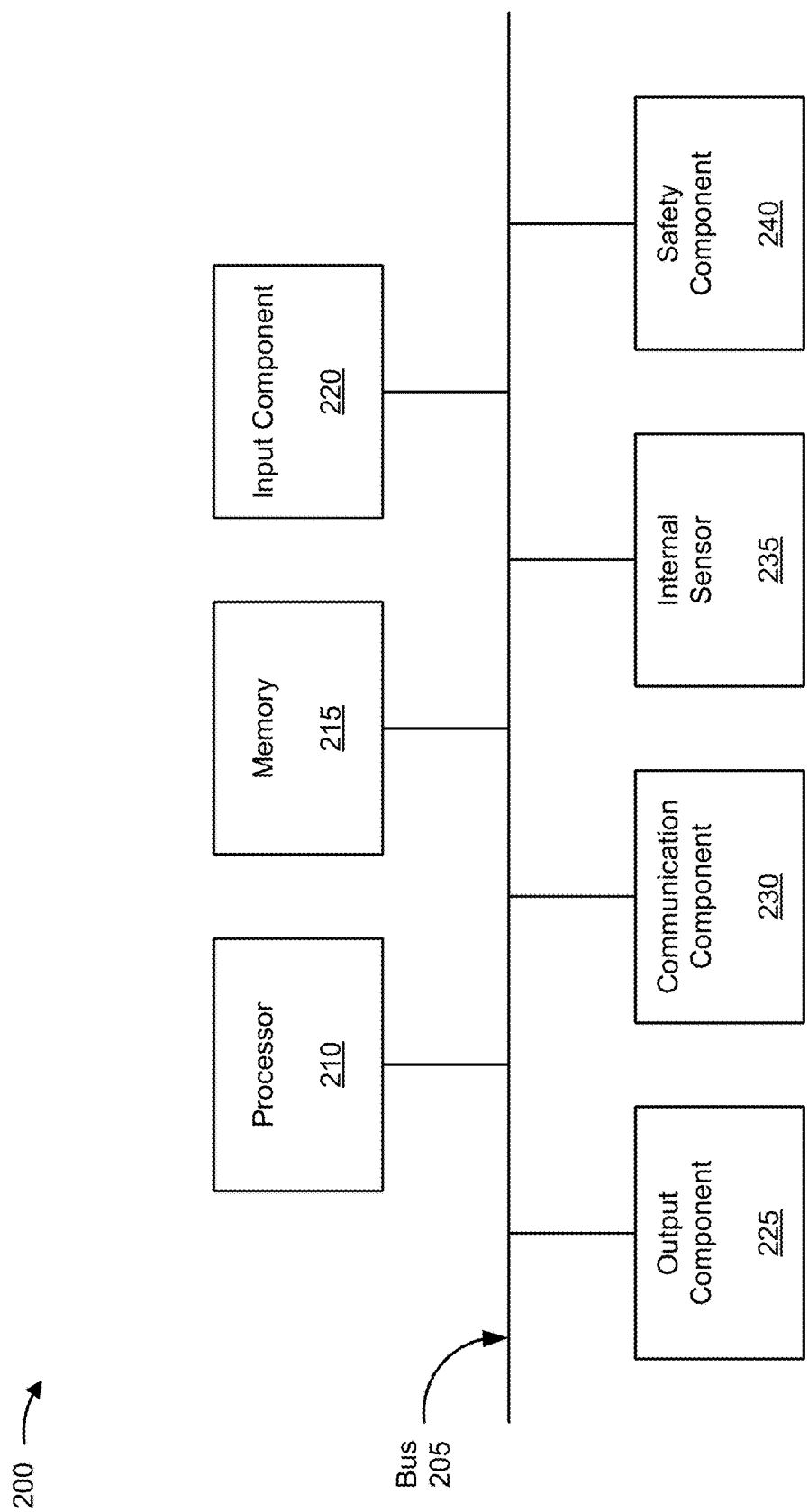
FIG. 2 is a diagram illustrating example components of a device, in accordance with the present disclosure.

FIG. 2 is a diagram illustrating example components of a device 200, in accordance with the present disclosure. The device 200 may correspond, for example, to the UE 120, the wireless communication device 110, or the device that includes the UE 120 and the wireless communication device 110. In some aspects, the UE 120, the wireless communication device 110, or the device that includes the UE 120 and the wireless communication device 110, may include one or more devices 200 and/or one or more components of the device 200. As shown in FIG. 2, the device 200 may include a bus 205, a processor 210, a memory 215, an input component 220, an output component 225, a communication component 230, an internal sensor 235, and/or a safety component 240.

The bus 205 may include one or more components that enable wired and/or wireless communication among the components of the device 200. The bus 205 may couple together two or more components of FIG. 2, such as via operative coupling, communicative coupling, electronic coupling, and/or electric coupling. For example, the bus 205 may include an electrical connection (e.g., a wire, a trace, and/or a lead) and/or a wireless bus. The processor 210 may include a central processing unit, a graphics processing unit, a microprocessor, a controller, a microcontroller, a digital signal processor, a field-programmable gate array, an application-specific integrated circuit, and/or another type of processing component. The processor 210 may be implemented in hardware, firmware, or a combination of hardware and software. In some aspects, the processor 210 may include one or more processors capable of being programmed to perform one or more operations or processes described elsewhere herein.

The memory 215 may include volatile and/or nonvolatile memory. For example, the memory 215 may include random access memory (RAM), read only memory (ROM), a hard disk drive, and/or another type of memory (e.g., a flash memory, a magnetic memory, and/or an optical memory). The memory 215 may include internal memory (e.g., RAM, ROM, or a hard disk drive) and/or removable memory (e.g., removable via a universal serial bus connection). The memory 215 may be a non-transitory computer-readable medium. The memory 215 may store information, one or more instructions, and/or software (e.g., one or more software applications) related to the operation of the device 200. In some aspects, the memory 215 may include one or more memories that are coupled (e.g., communicatively coupled) to one or more processors (e.g., processor 210), such as via the bus 205. Communicative coupling between a processor 210 and a memory 215 may enable the processor 210 to read and/or process information stored in the memory 215 and/or to store information in the memory 215.

The input component 220 may enable the device 200 to receive an input from a user of the device 200. For example, the input component 220 may include a touch screen, a keyboard, a keypad, a mouse, a button, a microphone, and/or a switch, among other examples. The output component 225 may enable the device 200 to provide output, such as via a display, a speaker, and/or a light-emitting diode. The communication component 230 may enable the device 200 to communicate with other devices via a wired connection and/or a wireless connection. For example, the communication component 230 may include a receiver, a transmitter, a transceiver, a modem, a network interface card, and/or an antenna.

The internal sensor 235 may be a sensor that is included in the device 200. For example, the internal sensor 235 may be located in the device 200 or on the device 200. The internal sensor 235 may be, or may include, a camera, a microphone, a motion sensor, a proximity sensor, a thermal sensor, an image sensor, a gyroscope, an accelerometer, or a magnetometer, among other examples. The internal sensor 235 may be configured to sense data within an environment of the device 200 and to provide the data to the safety component 240.

The safety component 240 may be configured to increase a safety of the device 200. For example, the safety component 240 may be configured to modify content displayed by the device 200 to improve the safety of the device 200. In some examples, the safety component 240 may modify the content in accordance with a center of gravity associated with the content. In some examples, the safety component 240 may modify the content in accordance with an input received from another device, such as a radio frequency input or a radar input. In some examples, the safety component 240 may modify the content in accordance with a heat map, where different portions of the heat map correspond to different levels of safety for interacting with the content. Additional details are described herein.

The device 200 may perform one or more operations or processes described herein. For example, a non-transitory computer-readable medium (e.g., memory 215) may store a set of instructions (e.g., one or more instructions or code) for execution by the processor 210. The processor 210 may execute the set of instructions to perform one or more operations or processes described herein. In some aspects, execution of the set of instructions, by one or more processors 210, causes the one or more processors 210 and/or the device 200 to perform one or more operations or processes described herein. In some aspects, hardwired circuitry may be used instead of or in combination with the instructions to perform one or more operations or processes described herein. Additionally, or alternatively, the processor 210 may be configured to perform one or more operations or processes described herein. Thus, aspects described herein are not limited to any specific combination of hardware circuitry and software.

In some aspects, device 200 may include means for identifying a boundary for interacting with content; means for determining a center of gravity within the boundary for interacting with the content; and/or means for modifying the content in accordance with the center of gravity. In some aspects, device 200 may include means for identifying a boundary for interacting with content; means for receiving, from another device, an input associated with the boundary for interacting with the content; and/or means for modifying the content in accordance with the input. In some aspects, device 200 may include means for identifying a boundary for interacting with content; means for generating a heat map associated with the boundary for interacting with the content; and/or means for modifying the content in accordance with the heat map. In some aspects, the means for device 200 to perform processes and/or operations described herein may include one or more components of device 200 described in connection with FIG. 2, such as bus 205, processor 210, memory 215, input component 220, output component 225, communication component 230, internal sensor 235, and/or safety component 240.

The number and arrangement of components shown in FIG. 2 are provided as an example. The device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

As indicated above, FIG. 2 is provided as an example. Other examples may differ from what is described with regard to FIG. 2.

Figure 3:
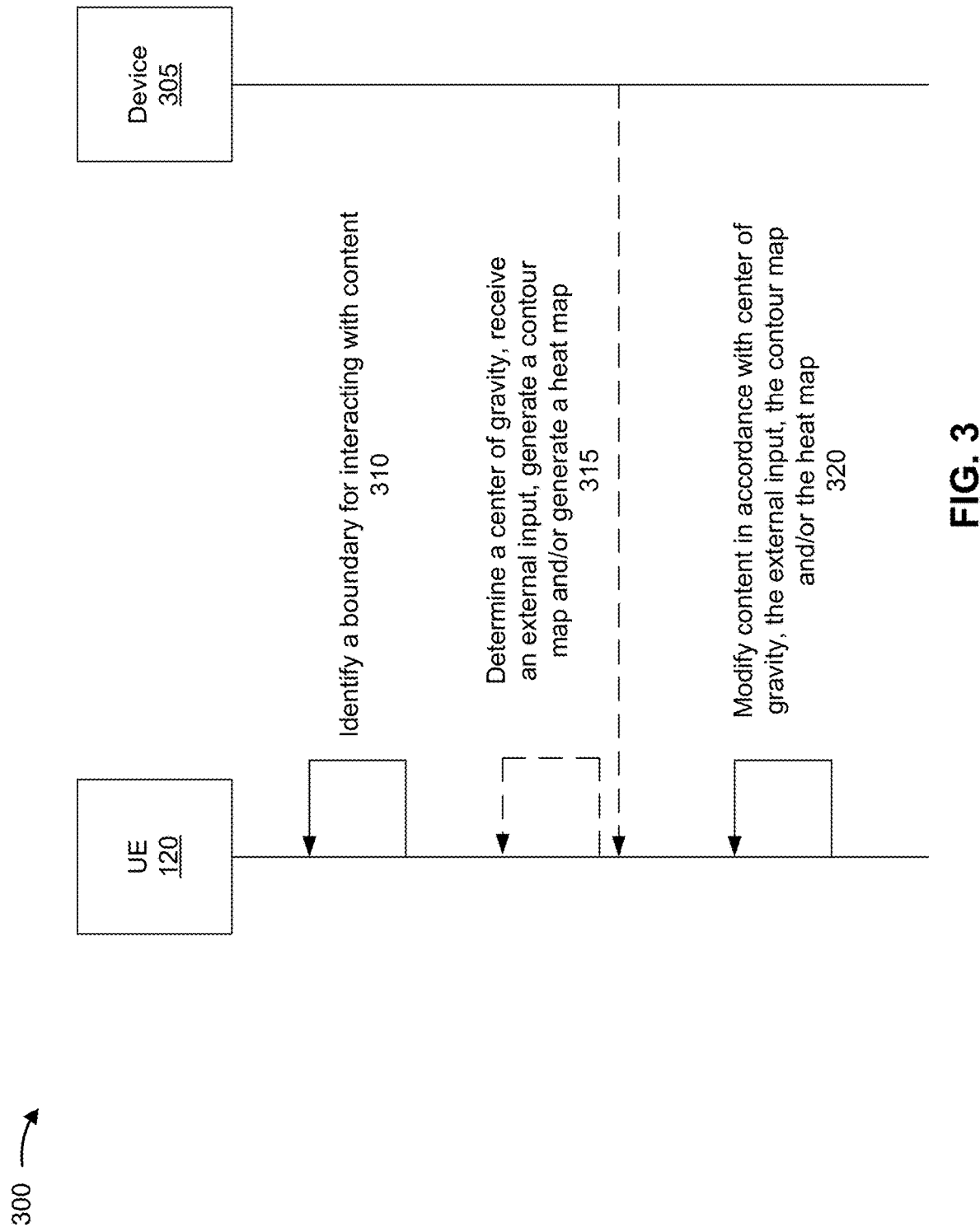
FIG. 3 is a diagram illustrating an example of content modification for improving user safety, in accordance with the present disclosure.

FIG. 3 is a diagram illustrating an example 300 of content modification for improving user safety, in accordance with the present disclosure. The UE 120 may be configured to modify content that is displayed by the UE 120 to improve a safety of a user of the UE 120 and/or to reduce a likelihood of damage to objects within an environment in which the UE 120 is located. In some aspects, the UE 120 may interact with a device 305. The device 305 may be a sensor, such as the sensor 140.

As shown by reference number 310, the UE 120 may identify a boundary for interacting with content. The boundary may indicate an area within which the user can view or interact with the content. For example, the user may view or interact with the content while the user is within the boundary, but may not view or interact with the content while the user is outside of the boundary. In some aspects, the UE 120 may detect that the user has left the boundary, and may pause the content and/or display a message for the user to re-enter the boundary if the user wants to continue viewing or interacting with the content.

In some aspects, the boundary may be a configured boundary or may be based at least in part on a configured boundary. For example, the boundary may be a default boundary having default dimensions. In some aspects, the UE 120 may identify or create the boundary in accordance with an input from one or more internal sensors. For example, a camera located in or on the UE 120 may detect a size of the environment and/or one or more objects located in the environment, and the UE 120 may identify or create the boundary based at least in part on the size of the environment and/or the one or more objects located in the environment. In some aspects, the UE 120 may identify or create the boundary based at least in part on an input from the user. For example, the user may generate the boundary, using one or more controls associated with the UE 120, based at least in part on a type of content being viewed, a preference of the user, a size of the environment, or one or more objects located in the environment, among other examples.

As shown by reference number 315, the UE 120 may determine a center of gravity, receive an input from an external device, generate a contour map, and/or generate a heat map.

In some aspects, the UE 120 may determine a center of gravity associated with the boundary. The center of gravity may be, for example, a center location within the boundary. In some aspects, the UE 120 may determine the center of gravity in accordance with one or more internal sensors. For example, an internal sensor, such as a camera, may determine a location of the user within the environment and/or may detect one or more objects within the environment. The UE 120 may perform one or more measurements, such as one or more measurements that determine a size of the one or more objects or a distance of the one or more objects from the user. The UE 120 may determine the center of gravity, or may modify the center of gravity, in accordance with the one or more measurements, such as to encourage the user to move in a direction that is away from the one or more objects. In some aspects, the center of gravity may be modified in accordance with an input from the user. For example, the user may select to move the center of gravity from the center location within the boundary to another location within the boundary that is associated with a high (or higher) level of safety. Additional details regarding these features are described in connection with FIG. 4.

In some aspects, the UE 120 may receive an input from an external device, such as the device 305. The external device may be any device that is not included within the UE 120. In one example, the device 305 may be a passive device, such as a passive tag, and the input may be a radio frequency input, such as an RFID signal, a distance measurement, or an echo indication (e.g., for determining a location of the user). In another example, the device 305 may be a radar-enabled device, such as a cellular telephone, and the input may be a radar signal. The external device may be associated with an area or an object (e.g., may be located in the area, on the object, or near the area or object), and the signal may indicate a safety level or a cost associated with the area or object. In some aspects, the UE 120 may receive multiple inputs from multiple external devices. For example, the UE 120 may receive a first input from a first external device that indicates a first safety level associated with a first area or object, a second input from a second external device that indicates a second safety level associated with a second area or object, and a third input from a third external device that indicates a third safety level associated with a third area or object. In some aspects, the first safety level may indicate that the area or object is mildly dangerous or mildly expensive to repair or replace, the second safety level may indicate that the area or object is moderately dangerous or moderately expensive to repair or replace, and the third safety level may indicate that the area or object is very dangerous or very expensive to repair or replace. Additional details regarding these features are described in connection with FIG. 5.

In some aspects, the UE 120 may identify or generate a contour map that includes one or more contours. Each contour of the one or more contours may be associated with a safety level. For example, a first contour may indicate a first area within the boundary that is associated with a higher safety level, a second contour may indicate a second area within the boundary that is associated with a moderate safety level, and a third contour may indicate a third area within the boundary that is associated with a lower safety level. The UE 120 may identify or generate the one or more contours based at least in part on the input received from the external device and/or based at least in part on an input from an internal sensor of the UE 120. In some aspects, the UE 120 may change (e.g., update) a contour in which the UE 120 is located in accordance with the input from the external device and/or the input from the internal sensor. For example, the UE 120 may obtain the input and may determine that the user of the UE 120 has moved from the third contour (associated with the lower level of safety) to the first contour (associated with the higher level of safety). In some aspects, the UE 120 may identify the contour map, generate the contour map, or update the contour map in accordance with signal information. The signal information may include, for example, a reference signal received power, an angle of arrival, an angle of departure, a latency, an angular speed, or a movement direction associated with the input received from the external device, among other examples.

In some aspects, the UE 120 may generate a heat map. The heat map may include multiple heat map indicators. Each heat map indicator may indicate a safety level or a cost associated with an area or object corresponding to the heat map indicator. The heat map indicators may have various characteristics to indicate the different safety levels or costs of the areas of objects. For example, the heat map indicators may have different colors, color hues, or color saturations, among other examples, to indicate the various safety levels or costs. In some aspects, the heat map indicators may be used to indicate different safety levels of different portions of the boundary. For example, a first heat map indicator having a first characteristic may indicate a first safety level associated with a first portion of the boundary, a second heat map indicator having a second characteristic may indicate a second safety level associated with a second portion of the boundary, and a third heat map indicator having a third characteristic may indicate a third safety level associated with a third portion of the boundary. In some aspects, the heat map indicators may be used to indicate different safety levels of different objects or areas in the environment in which the UE 120 is located. For example, the first heat map indicator having the first characteristic may indicate a first safety level associated with a first object or area in the environment, the second heat map indicator having the second characteristic may indicate a second safety level associated with a second object or area in the environment, and the third heat map indicator having the third characteristic may indicate a third safety level associated with a third object or area in the environment. Additional details regarding these features are described in connection with FIG. 6.

As shown by reference number 320, the UE 120 may modify the content in accordance with the center of gravity, the input from the external device, the contour map, and/or the heat map.

In some aspects, the UE 120 may modify the content in order to move the user toward the center of gravity. For example, the content may be modified to encourage the user to move toward the center of gravity. In one example, the content may be modified to encourage the user to make multiple incremental movements toward the center of gravity. For example, if the user is standing to the left of the center of gravity, the content may be modified to encourage the user to take multiple small steps to the right. In some aspects, the UE 120 may modify the content in accordance with the input received from the external device. For example, if an RFID tag located on an object indicates that the object is associated with a low level of safety or a high cost, the content may be modified to discourage the user from moving toward the object (or to encourage the user to move in other directions away from the object).

In one example, the UE 120 may receive one or more external signals from one or more external devices. Additionally, or alternatively, the UE 120 may obtain one or more internal signals from one or more internal sensors. The UE 120 may determine (e.g., calculate) a location of the user in accordance with the one or more external signals and/or the one or more internal signals. The UE 120 may determine contour information associated with the one or more external signals, such as a reference signal received power, an angle of arrival, an angle of departure, a latency, an angular speed, or a movement direction, among other examples, of the one or more external signals. The UE 120 may localize a location of the user, for example, relative to the center of gravity, in accordance with the contour information. The UE 120 may selectively modify the content in accordance with the contour information and/or in accordance with localizing the location of the user. In some aspects, the UE 120 may adjust a sensing mechanism (e.g., for the one or more external devices and/or the one or more internal sensors) in accordance with future content, such as to increase a periodicity or to lower a priority of a feature map. In some aspects, the UE 120 may offload a management to a server and/or to one or more external devices. The server and/or the one or more external devices may be configured to manage the creation and/or updating of the one or more contours for the UE 120. In one example, the UE 120 may receive inputs from multiple external devices, and may select one of the external devices to manage the creation and/or updating of the one or more contours.

In some aspects, the UE 120 may modify the content in accordance with the heat map. For example, the content may be modified to encourage the user to move toward a first heat map indicator associated with a first boundary portion having a higher safety level and/or to encourage the user to move away from a second heat map indicator associated with a second boundary portion having a lower safety level. Additionally, or alternatively, the content may be modified to encourage the user to move toward a first heat map indicator associated with a first object in the environment having a higher safety level and/or to encourage the user to move away from a second heat map indicator associated with a second object in the environment having a lower safety level. In one example, the UE 120 may detect that the content is requesting (or requiring) the user to jump. If the user is located near a first heat map indicator associated with a higher safety level, the UE 120 may not modify the content. However, if the user is located near a second heat map indicator associated with a lower safety level, the UE 120 may modify the content to discourage the user from jumping and/or to encourage the user to perform other actions less likely to result in injury to the user. For example, the content may be modified to encourage the user to move toward the first heat map indicator associated with the higher safety level, and then perform one or more jumping actions.

As indicated above, FIG. 3 is provided as an example. Other examples may differ from what is described with regard to FIG. 3.

Figure 4:
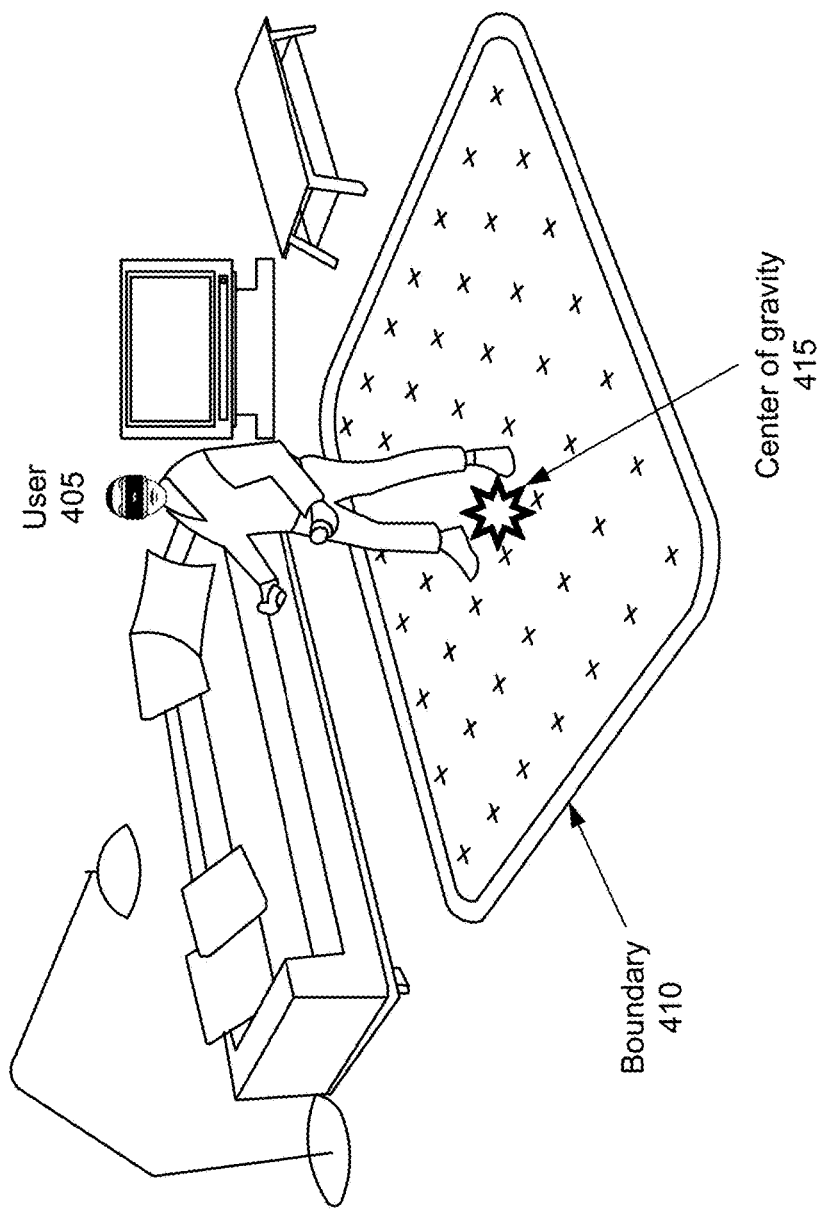
FIG. 4 is a diagram illustrating an example of a center of gravity for content interaction and modification, in accordance with the present disclosure.

FIG. 4 is a diagram illustrating an example 400 of a center of gravity for content interaction and modification, in accordance with the present disclosure. A UE 120 may display content to a user 405. The user 405 may view or interact with the content while the user 405 is within the boundary 410, but may not view or interact with the content while the user 405 is outside of the boundary 410. The boundary 410 may be a configured boundary, such as a default boundary having default dimensions, or may be a boundary that is created by the user 405 using one or more controls associated with the UE 120.

In some aspects, the UE 120 may identify or determine a center of gravity 415 associated with the boundary 410. The center of gravity 415 may be, for example, a center location within the boundary 410 or another location within the boundary 410 that is associated with a high level of safety. In some aspects, the center of gravity 415 may be modified in accordance with an input from the user 405. For example, the user 405, using one or more controls associated with the UE 120, may select to move the center of gravity 415 from the center location within the boundary 410 to another location within the boundary 410 that is associated with a higher level of safety and/or that is further away from an expensive object or area within the environment. In some aspects, the UE 120 may identify or determine the center of gravity 415 in accordance with one or more internal sensors. For example, a sensor (such as a camera) associated with the UE 120 may determine a location of the user 405 within the environment. Additionally, or alternatively, the sensor may detect one or more objects within the environment, such as a first object, a second object, and/or a third object. The UE 120 may perform one or more measurements, for example, to determine sizes of the objects, shapes of the objects, and/or distances of the objects from the user 405. The UE 120 may determine or adjust the center of gravity 415 in accordance with detecting the objects and/or in accordance with performing the one or more measurements. In the example 400, the center of gravity 415 may be defined relative to a front-left portion of the boundary 410 that is further away from the one or more objects detected by the sensor. As described above in connection with FIG. 3, the UE 120 may modify the content to encourage the user to move (e.g., in incremental movements) within the boundary 410 toward the center of gravity 415.

As indicated above, FIG. 4 is provided as an example. Other examples may differ from what is described with regard to FIG. 4.

Figure 5:
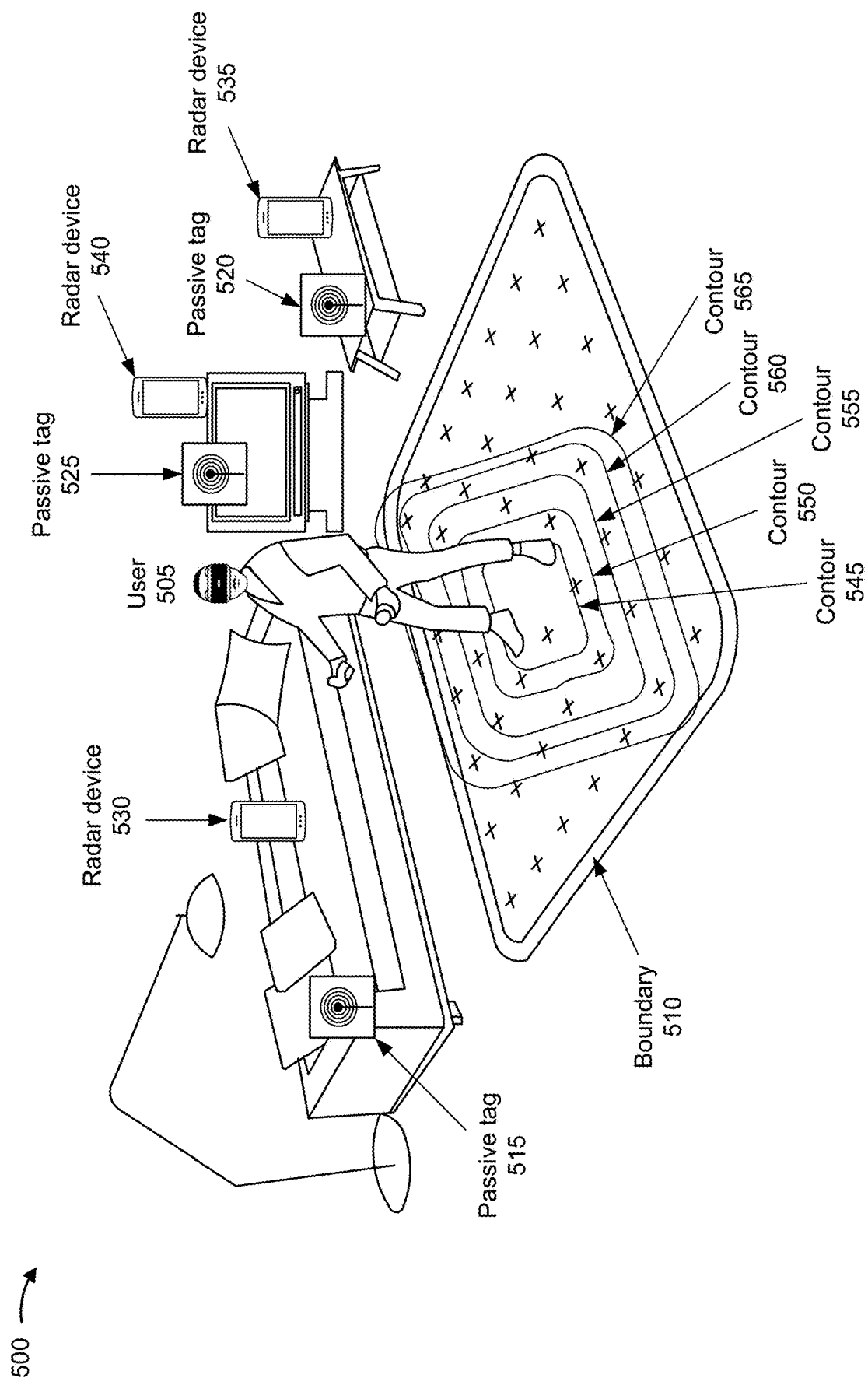
FIG. 5 is a diagram illustrating an example of an input from an external device for content interaction and modification, in accordance with the present disclosure.

FIG. 5 is a diagram illustrating an example 500 of an input from an external device for content interaction and modification, in accordance with the present disclosure. A UE 120 May display content to a user 505. The user 505 may view or interact with the content while the user 505 is within the boundary 510, but may not view or interact with the content while the user 505 is outside of the boundary 510. The boundary 510 may be a configured boundary, such as a default boundary having default dimensions, or may be a boundary that is created by the user 505 using one or more controls associated with the UE 120. In some aspects, the UE 120 may receive an input from one or more external devices. The one or more external devices may be associated with an area or object, and may indicate one or more features of the area or object, such as a safety associated with the area or object or a cost associated with the area or object. In some aspects, the one or more external devices may be placed in an area, on an object, or near an area or object, by a user of the UE 120.

In some aspects, the external device may be a passive tag, such as an RFID tag. In this case, the input may be, or may include, a radio frequency signal, such as an RFID signal, a distance measurement, or an echo indication. As shown in the example 500, an environment associated with the UE 120 may include one or more passive tags, such as a passive tag 515, a passive tag 520, and a passive tag 525. The passive tag 515 may be associated with a first area or object, such as a sofa. The passive tag 520 may be associated with a second area or object, such as a table. The passive tag 525 may be associated with a third area or object, such as a television. Each of the passive tags may transmit radio frequency signals, distance measurements, or echo indications to the UE 120. The radio frequency signals may indicate, for example, an extent to which the corresponding area or object is to be avoided by the user 505 of the UE 120.

In some aspects, the passive tags may indicate different safety levels or costs associated with the different areas or objects. For example, the passive tag 515 may indicate a first safety level or first cost associated with the sofa, the passive tag 520 may indicate a second safety level or second cost associated with the table, and the passive tag 525 may indicate a third safety level or cost associated with the television.

In some aspects, the external device may be a radar-enabled device ("radar device"), such as a cellular telephone. In this case, the input may be, or may include, a radar signal. As shown in the example 500, an environment associated with the UE 120 may include a radar device 530, a radar device 535, and a radar device 540. The radar device 530 may be associated with the first area or object, such as the sofa. The radar device 535 may be associated with the second area or object, such as the table. The radar device 540 may be associated with the third area or object, such as the television. Each of the radar devices may transmit radar signals to the UE 120. The radar signals may indicate, for example, an extent to which the corresponding area or object is to be avoided by the user 505 of the UE 120. In some aspects, the radar devices may indicate different safety levels or costs associated with the different areas or objects. For example, the radar device 530 may indicate a first safety level or first cost associated with the sofa, the radar device 535 may indicate a second safety level or second cost associated with the table, and the radar device 540 may indicate a third safety level or cost associated with the television.

In some aspects, the one or more external devices may include a combination of passive tags and radar-enabled devices. Additionally, or alternatively, the one or more external devices may include other types of devices configured to transmit other types of signals.

In some aspects, the UE 120 may identify or generate a contour map that includes a plurality of contours. The contour map may be based, for example, on the input received from the external device, such as the passive tag or the radar-enabled device. Each contour of the plurality of contours may indicate a safety level or cost associated with the area indicated by the contour. For example, a contour 545 may indicate a first safety level of a first area associated with the contour 545, a contour 550 may indicate a second safety level of a second area associated with the contour 550, a contour 555 may indicate a third safety level of a third area associated with the contour 555, a contour 560 may indicate a fourth safety level of a fourth area associated with the contour 560, and a contour 565 may indicate a fifth safety level of a fifth area associated with the contour 565. In some aspects, the contour map may be generated based at least in part on contour information associated, for example, with a reference signal received power, an angle of arrival, an angle of departure, a latency, an angular speed, or a movement direction of a received radio frequency signal or radar signal, among other examples. In some aspects, the UE 120 may change (e.g., update) a contour in which the UE 120 is located in accordance with an input, such as the input received from the external device and/or an input associated with an internal sensor of the UE 120. For example, the UE 120 may obtain the input and may determine that the user of the UE 120 has moved from the fourth contour (associated with a lower level of safety) to the first contour (associated with a higher level of safety).

As described above in connection with FIG. 3, the UE 120 may modify the content in accordance with the input from the one or more external devices. For example, the UE 120 may modify the content to encourage the user to move away from an area or object indicated by the input as being expensive or associated with a low level of safety, and/or to encourage the user to move toward an area or object indicated by the input as being inexpensive and/or associated with a high level of safety.

As indicated above, FIG. 5 is provided as an example. Other examples may differ from what is described with regard to FIG. 5.

Figure 6:
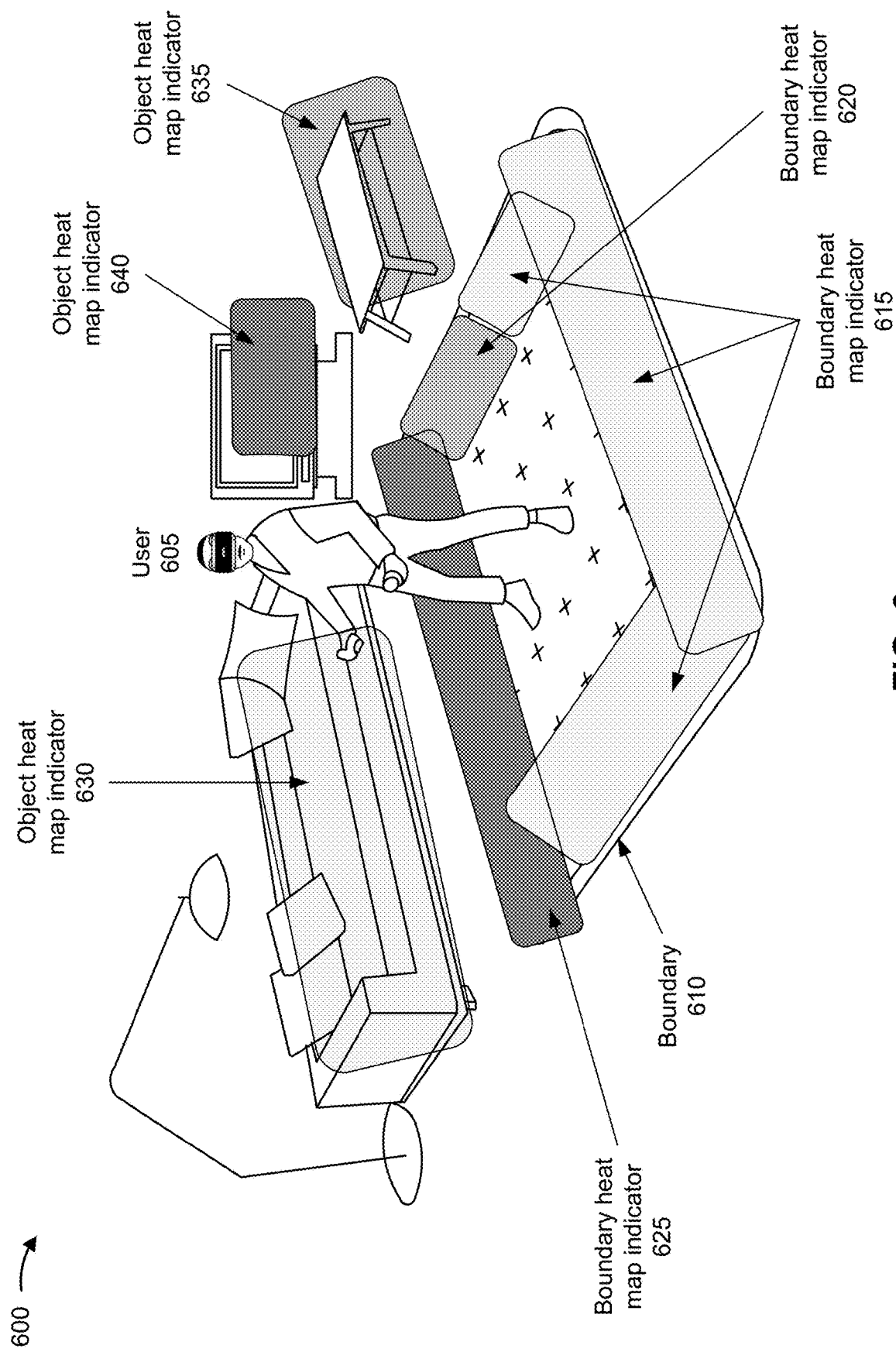
FIG. 6 is a diagram illustrating an example of a heat map for content interaction and modification, in accordance with the present disclosure.

FIG. 6 is a diagram illustrating an example 600 of a heat map for content interaction and modification, in accordance with the present disclosure. A UE 120 may display content to a user 605. The user 605 may view or interact with the content while the user 605 is within the boundary 610, but may not view or interact with the content while the user 605 is outside of the boundary 610. The boundary 610 may be a configured boundary, such as a default boundary having default dimensions, or may be a boundary that is created by the user 605 using one or more controls associated with the UE 120. In some aspects, the UE 120 may generate a heat map that includes one or more heat map indicators. The heat map may be generated, for example, in accordance with a user input and/or in accordance with one or more objects in the environment in which the UE 120 is located.

In some aspects, the heat map may include one or more boundary heat map indicators associated with one or more portions of the boundary 610. For example, a boundary heat map indicator 615 may be associated with a first portion of the boundary 610, a boundary heat map indicator 620 may be associated with a second portion of the boundary 610, and a boundary heat map indicator 625 may be associated with a third portion of the boundary 610. The boundary heat map indicators may have characteristics that indicate a safety or cost associated with the respective portions of the boundary 610. For example, the boundary heat map indicator 615 may have a first color, color hue, or saturation that indicates a first safety level associated with the first boundary portion, the boundary heat map indicator 620 may have a second color, color hue, or saturation that indicates a second safety level associated with the second boundary portion, and the boundary heat map indicator 625 may have a third color, color hue, or saturation that indicates a third safety level associated with the third boundary portion. The boundary heat map indicators may have adaptable shapes, depths, and dimensions.

In some aspects, the heat map may include one or more object heat map indicators associated with objects or areas in the environment in which the UE 120 is located. For example, an object heat map indicator 630 may be associated with a first object or area (e.g., a couch), an object heat map indicator 635 may be associated with a second object or area (e.g., a table), and an object heat map indicator 640 may be associated with a third object or area (e.g., a television). The object heat map indicators may have characteristics that indicate a safety or cost associated with the respective objects or areas. For example, the object heat map indicator 630 may have a first color, color hue, or saturation that indicates a first safety level associated with the couch, the object heat map indicator 635 may have a second color, color hue, or saturation that indicates a second safety level associated with the table, and the object heat map indicator 640 may have a third color, color hue, or saturation that indicates a third safety level associated with the television. The object heat map indicators may have adaptable shapes, depths, and dimensions.

In some aspects, the UE 120 may be configured with a library of heat map indicators. For example, each heat map indicator within the library of heat map indicators may be associated with a type of object, a value of an object, a classification of an object, or a safety level of an object, among other examples. The heat map indicators may be assigned to the respective objects by the UE 120 and/or in accordance with a user input.

As described above in connection with FIG. 3, the UE 120 may modify the content in accordance with the heat map. For example, the UE 120 may modify the content to encourage the user to move away from an area or object indicated by the heat map as being expensive or associated with a low level of safety, and/or to encourage the user to move toward an area or object indicated by the heat map as being inexpensive and/or associated with a high level of safety.

As indicated above, FIG. 6 is provided as an example. Other examples may differ from what is described with regard to FIG. 6.

Figure 7:
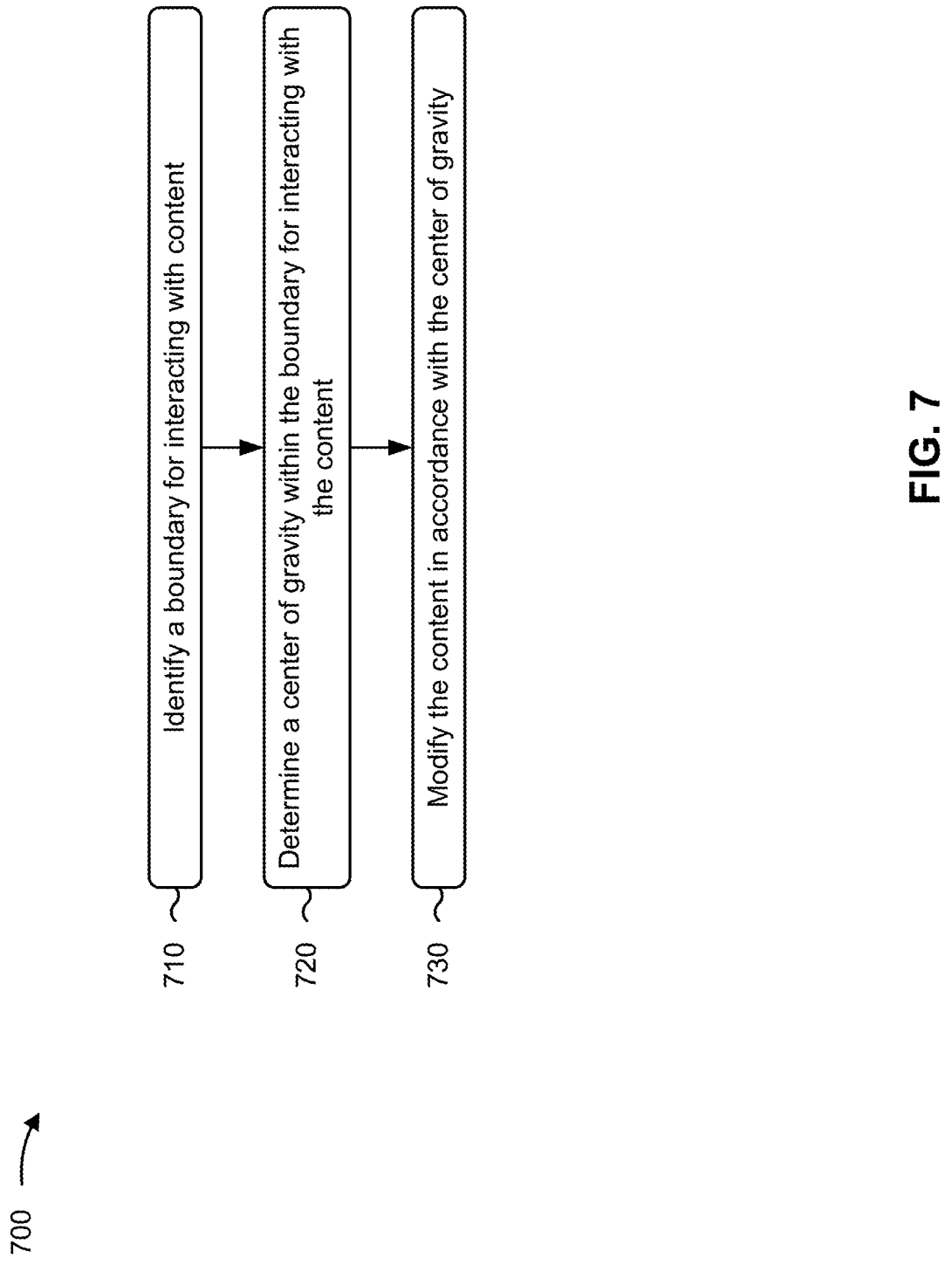
FIG. 7 is a flowchart of an example process associated with content modification for improving user safety, in accordance with the present disclosure.

FIG. 7 is a flowchart of an example process 700 associated with content modification for improving user safety, in accordance with the present disclosure. In some aspects, one or more process blocks of FIG. 7 are performed by a UE (e.g., UE 120). In some aspects, one or more process blocks of FIG. 7 are performed by another device or a group of devices separate from or including the UE, such as a wireless communication device (e.g., wireless communication device 110) and/or a sensor (e.g., sensor 140). Additionally, or alternatively, one or more process blocks of FIG. 7 may be performed by one or more components of device 200, such as processor 210, memory 215, input component 220, output component 225, communication component 230, internal sensor 235, and/or safety component 240.

As shown in FIG. 7, process 700 may include identifying a boundary for interacting with content (block 710). For example, the UE may identify a boundary for interacting with content, as described above.

As further shown in FIG. 7, process 700 may include determining a center of gravity within the boundary for interacting with the content (block 720). For example, the UE may determine a center of gravity within the boundary for interacting with the content, as described above.

As further shown in FIG. 7, process 700 may include modifying the content in accordance with the center of gravity (block 730). For example, the UE may modify the content in accordance with the center of gravity, as described above.

Process 700 may include additional aspects, such as any single aspect or any combination of aspects described below and/or in connection with one or more other processes described elsewhere herein.

In a first aspect, determining the center of gravity within the boundary comprises identifying a center location within the boundary.

In a second aspect, alone or in combination with the first aspect, modifying the content in accordance with the center of gravity comprises modifying the content to encourage a user to move in a direction that is toward the center of gravity.

In a third aspect, alone or in combination with one or more of the first and second aspects, process 700 includes identifying a location of a user associated with the UE, wherein modifying the content in accordance with the center of gravity comprises modifying the content in accordance with the center of gravity and the location of the user associated with the UE.

In a fourth aspect, alone or in combination with one or more of the first through third aspects, process 700 includes receiving an input, from a user associated with the UE, that indicates to adjust the center of gravity, and adjusting the center of gravity based at least in part on the input from the user of the UE.

In a fifth aspect, alone or in combination with one or more of the first through fourth aspects, process 700 includes detecting one or more objects in an area associated with the UE, and performing one or more measurements associated with the one or more objects, wherein determining the center of gravity within the boundary comprises determining the center of gravity based at least in part on a result of the one or more measurements.

In a sixth aspect, alone or in combination with one or more of the first through fifth aspects, process 700 includes receiving a radio frequency input, a distance measurement, or an echo indication from another device, wherein modifying the content in accordance with the center of gravity comprises modifying the content in accordance with the center of gravity and at least one of the radio frequency input, the distance measurement, or the echo indication.

In a seventh aspect, alone or in combination with one or more of the first through sixth aspects, process 700 includes receiving a radar input from another device, wherein modifying the content in accordance with the center of gravity comprises modifying the content in accordance with the center of gravity and the radar input.

In an eighth aspect, alone or in combination with one or more of the first through seventh aspects, process 700 includes receiving an input from another device, and determining, based at least in part on the input, a contour, of a plurality of contours associated with a contour map, in which the UE is located.

In a ninth aspect, alone or in combination with one or more of the first through eighth aspects, process 700 includes changing the contour to another contour of the plurality of contours associated with the contour map based at least in part on the input.

In a tenth aspect, alone or in combination with one or more of the first through ninth aspects, process 700 includes identifying at least one of a reference signal received power, an angle of arrival, an angle of departure, a latency, an angular speed, or a movement direction associated with the input.

In an eleventh aspect, alone or in combination with one or more of the first through tenth aspects, the UE is an extended reality device and the content is extended reality content.

Although FIG. 7 shows example blocks of process 700, in some aspects, process 700 includes additional blocks, fewer blocks, different blocks, or differently arranged blocks than those depicted in FIG. 7. Additionally, or alternatively, two or more of the blocks of process 700 may be performed in parallel.

Figure 8:
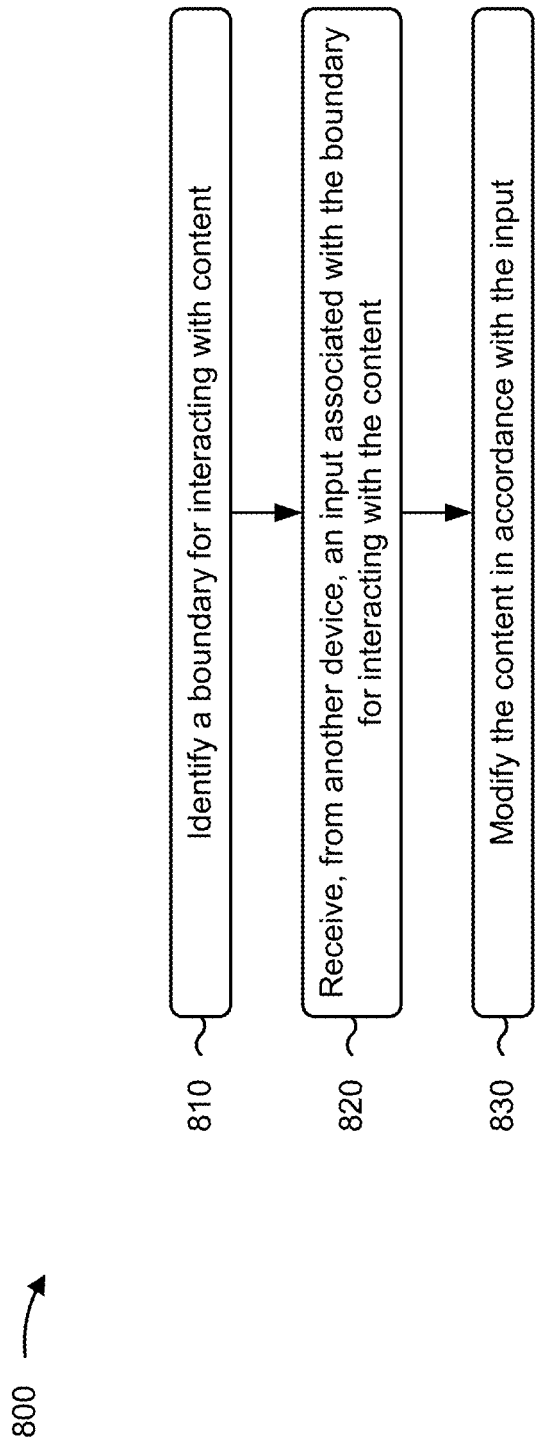
FIG. 8 is a flowchart of an example process associated with content modification for improving user safety, in accordance with the present disclosure.

FIG. 8 is a flowchart of an example process 800 associated with content modification for improving user safety, in accordance with the present disclosure. In some aspects, one or more process blocks of FIG. 8 are performed by a UE (e.g., UE 120). In some aspects, one or more process blocks of FIG. 8 are performed by another device or a group of devices separate from or including the UE, such as a wireless communication device (e.g., wireless communication device 110) and/or a sensor (e.g., sensor 140). Additionally, or alternatively, one or more process blocks of FIG. 8 may be performed by one or more components of device 200, such as processor 210, memory 215, input component 220, output component 225, communication component 230, internal sensor 235, and/or safety component 240.

As shown in FIG. 8, process 800 may include identifying a boundary for interacting with content (block 810). For example, the UE may identify a boundary for interacting with content, as described above.

As further shown in FIG. 8, process 800 may include receiving, from another device, an input associated with the boundary for interacting with the content (block 820). For example, the UE may receive, from another device, an input associated with the boundary for interacting with the content, as described above.

As further shown in FIG. 8, process 800 may include modifying the content in accordance with the input (block 830). For example, the UE may modify the content in accordance with the input, as described above.

Process 800 may include additional aspects, such as any single aspect or any combination of aspects described below and/or in connection with one or more other processes described elsewhere herein.

In a first aspect, modifying the content in accordance with the input comprises modifying the content to encourage a user to move in a direction that is toward a particular location within the boundary.

In a second aspect, alone or in combination with the first aspect, the particular location within the boundary is a center of gravity within the boundary.

In a third aspect, alone or in combination with one or more of the first and second aspects, the other device is a passive tag and the input is a radio frequency signal, a distance measurement, or an echo indication.

In a fourth aspect, alone or in combination with one or more of the first through third aspects, the other device is a radar-enabled device and the input is a radar signal.

In a fifth aspect, alone or in combination with one or more of the first through fourth aspects, process 800 includes determining, based at least in part on the input, a contour, of a plurality of contours associated with a contour map, in which the UE is located.

In a sixth aspect, alone or in combination with one or more of the first through fifth aspects, each contour of the plurality of contours is indicated by a respective color of a plurality of colors, and process 800 includes generating a heat map associated with a plurality of objects in an environment of the UE, wherein a distance between a contour of the plurality of contours and an object of the plurality of objects is in accordance with at least one of a user input or a safety associated with the object.

In a seventh aspect, alone or in combination with one or more of the first through sixth aspects, process 800 includes changing the contour to another contour of the plurality of contours associated with the contour map based at least in part on the input.

In an eighth aspect, alone or in combination with one or more of the first through seventh aspects, process 800 includes identifying at least one of a reference signal received power, an angle of arrival, an angle of departure, a latency, an angular speed, or a movement direction associated with the input.

In a ninth aspect, alone or in combination with one or more of the first through eighth aspects, process 800 includes obtaining another input from a sensor associated with the UE, and determining a location of the UE relative to the boundary based at least in part on contour information associated with the input or the other input.

In a tenth aspect, alone or in combination with one or more of the first through ninth aspects, the contour information associated with the input or the other input includes contour information associated with a reference signal received power, an angle of arrival, an angle of departure, a latency, an angular speed, or a movement direction associated with at least one of the input or the other input.

In an eleventh aspect, alone or in combination with one or more of the first through tenth aspects, process 800 includes calculating a first weighted average for a first plurality of sensors associated with a first plurality of objects, and calculating a second weighted average for a second plurality of sensors associated with a second plurality of objects, wherein modifying the content comprises modifying the content to move a user (e.g., to encourage a user to move) in a direction that is towards the first plurality of objects or in a direction that is away from the second plurality of objects.

In a twelfth aspect, alone or in combination with one or more of the first through eleventh aspects, process 800 includes transmitting, to another device, an indication to manage the contour information for the UE.

In a thirteenth aspect, alone or in combination with one or more of the first through twelfth aspects, the UE is an extended reality device and the content is extended reality content.

Although FIG. 8 shows example blocks of process 800, in some aspects, process 800 includes additional blocks, fewer blocks, different blocks, or differently arranged blocks than those depicted in FIG. 8. Additionally, or alternatively, two or more of the blocks of process 800 may be performed in parallel.

Figure 9:
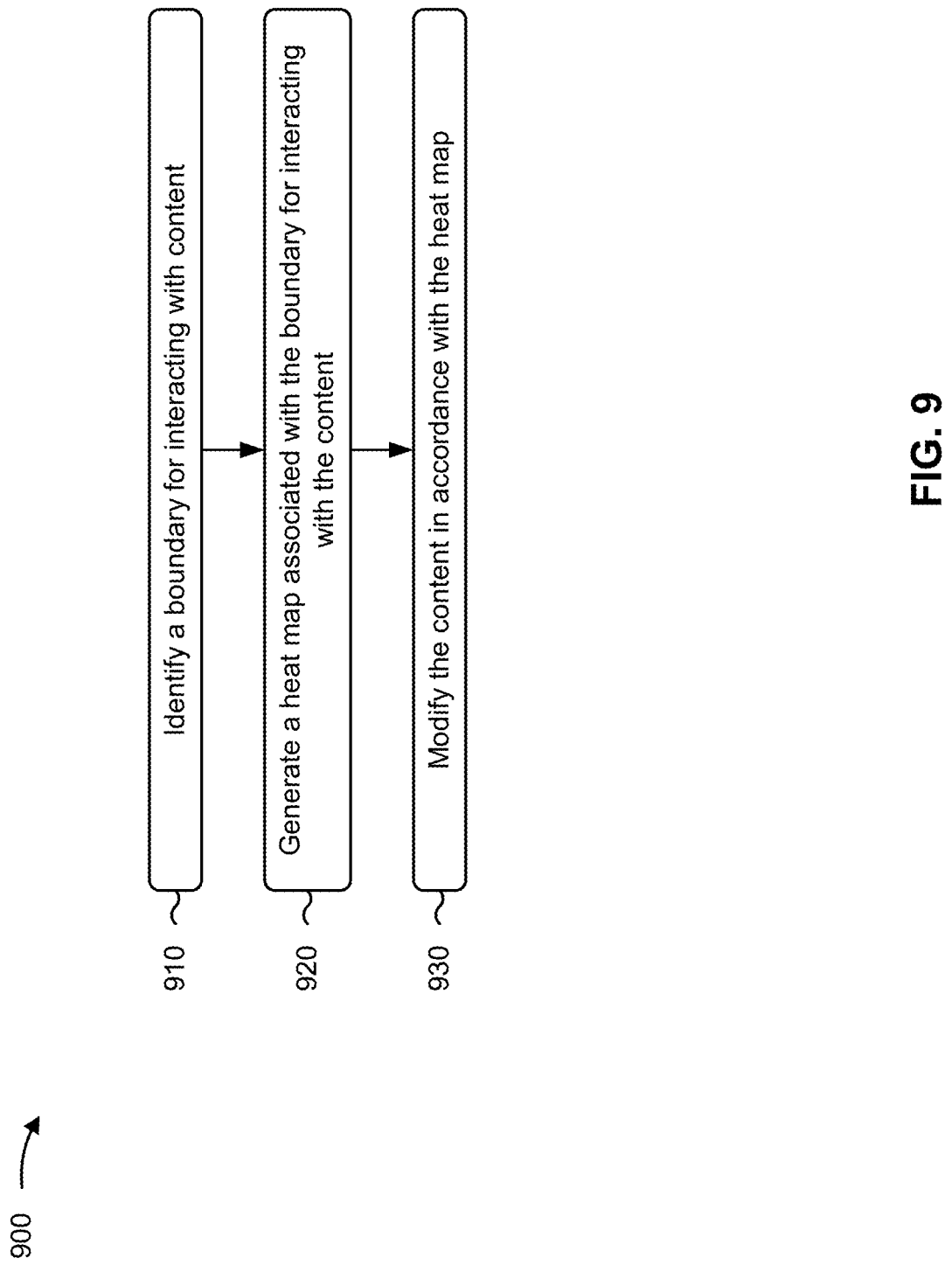
FIG. 9 is a flowchart of an example process associated with content modification for improving user safety, in accordance with the present disclosure.

FIG. 9 is a flowchart of an example process 900 associated with content modification for improving user safety, in accordance with the present disclosure. In some aspects, one or more process blocks of FIG. 9 are performed by a UE (e.g., UE 120). In some aspects, one or more process blocks of FIG. 9 are performed by another device or a group of devices separate from or including the UE, such as a wireless communication device (e.g., wireless communication device 110) and/or a sensor (e.g., sensor 140). Additionally, or alternatively, one or more process blocks of FIG. 9 may be performed by one or more components of device 200, such as processor 210, memory 215, input component 220, output component 225, communication component 230, internal sensor 235, and/or safety component 240.

As shown in FIG. 9, process 900 may include identifying a boundary for interacting with content (block 910). For example, the UE may identify a boundary for interacting with content, as described above.

As further shown in FIG. 9, process 900 may include generating a heat map associated with the boundary for interacting with the content (block 920). For example, the UE may generate a heat map associated with the boundary for interacting with the content, as described above.

As further shown in FIG. 9, process 900 may include modifying the content in accordance with the heat map (block 930). For example, the UE may modify the content in accordance with the heat map, as described above.

Process 900 may include additional aspects, such as any single aspect or any combination of aspects described below and/or in connection with one or more other processes described elsewhere herein.

In a first aspect, modifying the content in accordance with the heat map comprises modifying the content to encourage a user to move away from a first portion of the heat map that is associated with a lower safety level or to encourage the user to move toward a second portion of the heat map that is associated with a higher safety level.

In a second aspect, alone or in combination with the first aspect, modifying the content in accordance with the heat map comprises initiating a safety mode based at least in part on detecting one or more heat map indicators associated with a low safety level.

In a third aspect, alone or in combination with one or more of the first and second aspects, generating the heat map comprises assigning at least a first heat map indicator to a first portion of the boundary and a second heat map indicator to a second portion of the boundary.

In a fourth aspect, alone or in combination with one or more of the first through third aspects, the first heat map indicator indicates a first safety level associated with the first portion of the boundary and the second heat map indicator indicates a second safety level associated with the second portion of the boundary.

In a fifth aspect, alone or in combination with one or more of the first through fourth aspects, the first heat map indicator is associated with a first color, a first shape, or a first dimension, and the second heat map indicator is associated with a second color, a second shape, or a second dimension.

In a sixth aspect, alone or in combination with one or more of the first through fifth aspects, generating the heat map comprises assigning at least a first heat map indicator to a first object within an area in which the UE is located and a second heat map indicator to a second object within the area in which the UE is located.

In a seventh aspect, alone or in combination with one or more of the first through sixth aspects, the first heat map indicator indicates a first safety level associated with the first object and the second heat map indicator indicates a second safety level associated with the second object.

In an eighth aspect, alone or in combination with one or more of the first through seventh aspects, the first object is associated with a first object type, a first object value, or a first object classification, and the second object is associated with a second object type, a second object value, or a second object classification.

In a ninth aspect, alone or in combination with one or more of the first through eighth aspects, the first heat map indicator is associated with a first color, a first shape, or a first dimension, and the second heat map indicator is associated with a second color, a second shape, or a second dimension.

In a tenth aspect, alone or in combination with one or more of the first through ninth aspects, generating the heat map comprises generating the heat map in accordance with a user input.

In an eleventh aspect, alone or in combination with one or more of the first through tenth aspects, generating the heat map comprises generating the heat map in accordance with an input from a sensor associated with the UE.

In a twelfth aspect, alone or in combination with one or more of the first through eleventh aspects, the UE is an extended reality device and the content is extended reality content.

Although FIG. 9 shows example blocks of process 900, in some aspects, process 900 includes additional blocks, fewer blocks, different blocks, or differently arranged blocks than those depicted in FIG. 9. Additionally, or alternatively, two or more of the blocks of process 900 may be performed in parallel.

The following provides an overview of some Aspects of the present disclosure:

Aspect 1: A method of wireless communication performed by a user equipment (UE), comprising: identifying a boundary for interacting with content; determining a center of gravity within the boundary for interacting with the content; and modifying the content in accordance with the center of gravity.

Aspect 2: The method of Aspect 1, wherein determining the center of gravity within the boundary comprises identifying a center location within the boundary.

Aspect 3: The method of any of Aspects 1-2, wherein modifying the content in accordance with the center of gravity comprises modifying the content to encourage a user to move in a direction that is toward the center of gravity.

Aspect 4: The method of any of Aspects 1-3, further comprising identifying a location of a user associated with the UE, wherein modifying the content in accordance with the center of gravity comprises modifying the content in accordance with the center of gravity and the location of the user associated with the UE.

Aspect 5: The method of any of Aspects 1-4, further comprising: receiving an input, from a user associated with the UE, that indicates to adjust the center of gravity; and adjusting the center of gravity based at least in part on the input from the user of the UE.

Aspect 6: The method of any of Aspects 1-5, further comprising: detecting one or more objects in an area associated with the UE; and performing one or more measurements associated with the one or more objects, wherein determining the center of gravity within the boundary comprises determining the center of gravity based at least in part on a result of the one or more measurements.

Aspect 7: The method of any of Aspects 1-6, further comprising receiving a radio frequency input, a distance measurement, or an echo indication from another device, wherein modifying the content in accordance with the center of gravity comprises modifying the content in accordance with the center of gravity and at least one of the radio frequency input, the distance measurement, or the echo indication.

Aspect 8: The method of any of Aspects 1-7, further comprising receiving a radar input from another device, wherein modifying the content in accordance with the center of gravity comprises modifying the content in accordance with the center of gravity and the radar input.

Aspect 9: The method of any of Aspects 1-8, further comprising; receiving an input from another device; and determining, based at least in part on the input, a contour, of a plurality of contours associated with a contour map, in which the UE is located.

Aspect 10: The method of Aspect 9, further comprising changing the contour to another contour of the plurality of contours associated with the contour map based at least in part on the input.

Aspect 11: The method of Aspect 9, further comprising identifying at least one of a reference signal received power, an angle of arrival, an angle of departure, a latency, an angular speed, or a movement direction associated with the input.

Aspect 12: The method of any of Aspects 1-11, wherein the UE is an extended reality device and the content is extended reality content.

Aspect 13: A method of wireless communication performed by a user equipment (UE), comprising: identifying a boundary for interacting with content; receiving, from another device, an input associated with the boundary for interacting with the content; and modifying the content in accordance with the input.

Aspect 14: The method of Aspect 13, wherein modifying the content in accordance with the input comprises modifying the content to encourage a user to move in a direction that is toward a particular location within the boundary.

Aspect 15: The method of Aspect 14, wherein the particular location within the boundary is a center of gravity within the boundary.

Aspect 16: The method of any of Aspects 13-15, wherein the other device is a passive tag and the input is a radio frequency signal, a distance measurement, or an echo indication.

Aspect 17: The method of any of Aspects 13-16, wherein the other device is a radar-enabled device and the input is a radar signal.

Aspect 18: The method of any of Aspects 13-17, further comprising determining, based at least in part on the input, a contour, of a plurality of contours associated with a contour map, in which the UE is located.

Aspect 19: The method of Aspect 18, wherein each contour of the plurality of contours is indicated by a respective color of a plurality of colors, and wherein the method further comprises generating a heat map associated with a plurality of objects in an environment of the UE, wherein a distance between a contour of the plurality of contours and an object of the plurality of objects is in accordance with at least one of a user input or a safety associated with the object.

Aspect 20: The method of Aspect 18, further comprising changing the contour to another contour of the plurality of contours associated with the contour map based at least in part on the input.

Aspect 21: The method of Aspect 18, further comprising identifying at least one of a reference signal received power, an angle of arrival, an angle of departure, a latency, an angular speed, or a movement direction associated with the input.

Aspect 22: The method of any of Aspects 13-21, further comprising: obtaining another input from a sensor associated with the UE; and determining a location of the UE relative to the boundary based at least in part on contour information associated with the input or the other input.

Aspect 23: The method of Aspect 22, wherein the contour information associated with the input or the other input includes contour information associated with a reference signal received power, an angle of arrival, an angle of departure, a latency, an angular speed, or a movement direction associated with at least one of the input or the other input.

Aspect 24: The method of Aspect 22, further comprising: calculating a first weighted average for a first plurality of sensors associated with a first plurality of objects; and calculating a second weighted average for a second plurality of sensors associated with a second plurality of objects, wherein modifying the content comprises modifying the content to move a user in a direction that is towards the first plurality of objects or in a direction that is away from the second plurality of objects.

Aspect 25: The method of Aspect 22, further comprising transmitting, to another device, an indication to manage the contour information for the UE.

Aspect 26: The method of any of Aspects 13-25, wherein the UE is an extended reality device and the content is extended reality content.

Aspect 27: A method of wireless communication performed by a user equipment (UE), comprising: identifying a boundary for interacting with content; generating a heat map associated with the boundary for interacting with the content; and modifying the content in accordance with the heat map.

Aspect 28: The method of Aspect 27, wherein modifying the content in accordance with the heat map comprises modifying the content to encourage a user to move away from a first portion of the heat map that is associated with a lower safety level or to encourage the user to move toward a second portion of the heat map that is associated with a higher safety level.

Aspect 29: The method of any of Aspects 27-28, wherein modifying the content in accordance with the heat map comprises initiating a safety mode based at least in part on detecting one or more heat map indicators associated with a low safety level.

Aspect 30: The method of any of Aspects 27-29, wherein generating the heat map comprises assigning at least a first heat map indicator to a first portion of the boundary and a second heat map indicator to a second portion of the boundary.

Aspect 31: The method of Aspect 30, wherein the first heat map indicator indicates a first safety level associated with the first portion of the boundary and the second heat map indicator indicates a second safety level associated with the second portion of the boundary.

Aspect 32: The method of Aspect 30, wherein the first heat map indicator is associated with a first color, a first shape, or a first dimension, and the second heat map indicator is associated with a second color, a second shape, or a second dimension.

Aspect 33: The method of any of Aspects 27-32, wherein generating the heat map comprises assigning at least a first heat map indicator to a first object within an area in which the UE is located and a second heat map indicator to a second object within the area in which the UE is located.

Aspect 34: The method of Aspect 33, wherein the first heat map indicator indicates a first safety level associated with the first object and the second heat map indicator indicates a second safety level associated with the second object.

Aspect 35: The method of Aspect 33, wherein the first object is associated with a first object type, a first object value, or a first object classification, and the second object is associated with a second object type, a second object value, or a second object classification.

Aspect 36: The method of Aspect 33, wherein the first heat map indicator is associated with a first color, a first shape, or a first dimension, and the second heat map indicator is associated with a second color, a second shape, or a second dimension.

Aspect 37: The method of any of Aspects 27-36, wherein generating the heat map comprises generating the heat map in accordance with a user input.

Aspect 38: The method of any of Aspects 27-37, wherein generating the heat map comprises generating the heat map in accordance with an input from a sensor associated with the UE.

Aspect 39: The method of any of Aspects 27-38, wherein the UE is an extended reality device and the content is extended reality content.

Aspect 40: A user equipment (UE) for wireless communication, comprising: one or more memories; and one or more processors, coupled to the one or more memories, configured to: identify a boundary for interacting with content; determine a center of gravity within the boundary for interacting with the content; and modify the content in accordance with the center of gravity.

Aspect 41: A user equipment (UE) for wireless communication, comprising: one or more memories; and one or more processors, coupled to the one or more memories, configured to: identify a boundary for interacting with content; receive, from another device, an input associated with the boundary for interacting with the content; and modify the content in accordance with the input.

Aspect 42: A user equipment (UE) for wireless communication, comprising: one or more memories; and one or more processors, coupled to the one or more memories, configured to: identify a boundary for interacting with content; generate a heat map associated with the boundary for interacting with the content; and modify the content in accordance with the heat map.

Aspect 43: A non-transitory computer-readable medium storing a set of instructions, the set of instructions comprising: one or more instructions that, when executed by one or more processors of a user equipment (UE), cause the UE to: identify a boundary for interacting with content; determine a center of gravity within the boundary for interacting with the content; and modify the content in accordance with the center of gravity.

Aspect 44: A non-transitory computer-readable medium storing a set of instructions, the set of instructions comprising: one or more instructions that, when executed by one or more processors of a user equipment (UE), cause the UE to: identify a boundary for interacting with content; receive, from another device, an input associated with the boundary for interacting with the content; and modify the content in accordance with the input.

Aspect 45: A non-transitory computer-readable medium storing a set of instructions, the set of instructions comprising: one or more instructions that, when executed by one or more processors of a user equipment (UE), cause the UE to: identify a boundary for interacting with content; generate a heat map associated with the boundary for interacting with the content; and modify the content in accordance with the heat map.

Aspect 46: An apparatus, comprising: means for identifying a boundary for interacting with content; means for determining a center of gravity within the boundary for interacting with the content; and means for modifying the content in accordance with the center of gravity.

Aspect 47: An apparatus, comprising: means for identifying a boundary for interacting with content; means for receiving, from another device, an input associated with the boundary for interacting with the content; and means for modifying the content in accordance with the input.

Aspect 48: An apparatus, comprising: means for identifying a boundary for interacting with content; means for generating a heat map associated with the boundary for interacting with the content; and means for modifying the content in accordance with the heat map.

Aspect 49: A system configured to perform one or more operations recited in one or more of Aspects 1-48.

Aspect 50: An apparatus comprising means for performing one or more operations recited in one or more of Aspects 1-48.

Aspect 51: A non-transitory computer-readable medium storing a set of instructions, the set of instructions comprising one or more instructions that, when executed by a device, cause the device to perform one or more operations recited in one or more of Aspects 1-48.

Aspect 52: A computer program product comprising instructions or code for executing one or more operations recited in one or more of Aspects 1-48.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
identify a boundary for interacting with content;
identify a center location within the boundary;
determine, based at least in part on identification of the center location, a center of gravity within the boundary, wherein the center of gravity is different from the center location; and
modify the content in accordance with the center of gravity.

2. The UE of claim 1,
wherein the one or more processors, to modify the content in accordance with the center of gravity, are configured to modify the content to encourage a user to move in a direction that is toward the center of gravity.

3. The UE of claim 1,
wherein the one or more processors are further configured to:
receive an input, from a user associated with the UE, that indicates to adjust the center of gravity; and
adjust the center of gravity based at least in part on the input from the user of the UE.

4. The UE of claim 1,
wherein the one or more processors are further configured to:
detect one or more objects in an area associated with the UE; and
perform one or more measurements associated with the one or more objects,
wherein the one or more processors, to determine the center of gravity, are configured to determine the center of gravity based at least in part on a result of the one or more measurements.

5. The UE of claim 1,
wherein the one or more processors are further configured to receive a radio frequency input, a distance measurement, or an echo indication from another device, wherein modifying the content in accordance with the center of gravity comprises modifying the content in accordance with the center of gravity and at least one of the radio frequency input, the distance measurement, or the echo indication.

6. The UE of claim 1,
wherein the one or more processors are further configured to receive a radar input from another device, wherein modifying the content in accordance with the center of gravity comprises modifying the content in accordance with the center of gravity and the radar input.

7. The UE of claim 1,
wherein the one or more processors are further configured to;
receive an input from another device; and
determine, based at least in part on the input, a contour, of a plurality of contours associated with a contour map, in which the UE is located.

8. The UE of claim 7,
wherein the one or more processors are further configured to change the contour to another contour of the plurality of contours associated with the contour map based at least in part on the input.

9. The UE of claim 7,
wherein the one or more processors are further configured to identify at least one of a reference signal received power, an angle of arrival, an angle of departure, a latency, an angular speed, or a movement direction associated with the input.

10. A method of wireless communication performed by a user equipment (UE), comprising:
identifying a boundary for interacting with content;
identifying a center location within the boundary;
determining, based at least in part on identification of the center location, a center of gravity within the boundary, wherein the center of gravity is different from the center location; and
modifying the content in accordance with the center of gravity.

11. The method of claim 10,
wherein modifying the content in accordance with the center of gravity comprises modifying the content to encourage a user to move in a direction that is toward the center of gravity.

12. The method of claim 10, further comprising:
receiving an input, from a user associated with the UE, that indicates to adjust the center of gravity; and
adjusting the center of gravity based at least in part on the input from the user of the UE.

13. The method of claim 10, further comprising:
detecting one or more objects in an area associated with the UE; and
performing one or more measurements associated with the one or more objects,
wherein determining the center of gravity comprises determining the center of gravity based at least in part on a result of the one or more measurements.

14. The method of claim 10, further comprising:
receiving a radio frequency input, a distance measurement, or an echo indication from another device, wherein modifying the content in accordance with the center of gravity comprises modifying the content in accordance with the center of gravity and at least one of the radio frequency input, the distance measurement, or the echo indication.

15. The method of claim 10, further comprising:
receiving a radar input from another device, wherein modifying the content in accordance with the center of gravity comprises modifying the content in accordance with the center of gravity and the radar input.

16. The method of claim 10, further comprising:
receiving an input from another device; and
determining, based at least in part on the input, a contour, of a plurality of contours associated with a contour map, in which the UE is located.

17. The method of claim 16, further comprising
changing the contour to another contour of the plurality of contours associated with the contour map based at least in part on the input.

18. The method of claim 16, further comprising:
identifying at least one of a reference signal received power, an angle of arrival, an angle of departure, a latency, an angular speed, or a movement direction associated with the input.

19. A non-transitory computer-readable medium storing a set of instructions for wireless communication, the set of instructions comprising:
one or more instructions that, when executed by one or more processors of a user equipment (UE), cause the UE to:
identify a boundary for interacting with content;
identify a center location within the boundary;

determine, based at least in part on identification of the center location, a center of gravity within the boundary, wherein the center of gravity is different from the center location; and modify the content in accordance with the center of gravity.

20. The non-transitory computer-readable medium of claim 19, wherein the one or more instructions, that cause the UE to modify the content in accordance with the center of gravity, cause the UE to modify the content to encourage a user to move in a direction that is toward the center of gravity.

21. The non-transitory computer-readable medium of claim 19, wherein the one or more instructions further cause the UE to:

receive an input, from a user associated with the UE, that indicates to adjust the center of gravity; and adjust the center of gravity based at least in part on the input from the user of the UE.

22. The non-transitory computer-readable medium of claim 19, wherein the one or more instructions further cause the UE to:

detect one or more objects in an area associated with the UE; and perform one or more measurements associated with the one or more objects, wherein the one or more instructions, that cause the UE to determine the center of gravity, cause the UE to determine the center of gravity based at least in part on a result of the one or more measurements.

23. The non-transitory computer-readable medium of claim 19, wherein the one or more instructions further cause the UE to receive a radio frequency input, a distance measurement, or an echo indication from another device, wherein modifying the content in accordance with the center of gravity comprises modifying the content in accordance with the center of gravity and at least one of the radio frequency input, the distance measurement, or the echo indication.

24. The non-transitory computer-readable medium of claim 19, wherein the one or more instructions further cause the UE to receive a radar input from another device, wherein modifying the content in accordance with the center of gravity comprises modifying the content in accordance with the center of gravity and the radar input.

25. The non-transitory computer-readable medium of claim 19, wherein the one or more instructions further cause the UE to:

receive an input from another device; and determine, based at least in part on the input, a contour, of a plurality of contours associated with a contour map, in which the UE is located.

26. The non-transitory computer-readable medium of claim 25, wherein the one or more instructions further cause the UE to change the contour to another contour of the plurality of contours associated with the contour map based at least in part on the input.

27. The non-transitory computer-readable medium of claim 25, wherein the one or more instructions further cause the UE to identify at least one of a reference signal received power, an angle of arrival, an angle of departure, a latency, an angular speed, or a movement direction associated with the input.

28. An apparatus for wireless communication, comprising:

means for identifying a boundary for interacting with content;

means for identifying a center location within the boundary;

means for determining, based at least in part on identification of the center location, a center of gravity within the boundary, wherein the center of gravity is different from the center location; and means for modifying the content in accordance with the center of gravity.

29. The apparatus of claim 28, wherein the means for modifying the content in accordance with the center of gravity comprise means for modifying the content to encourage a user to move in a direction that is toward the center of gravity.

30. The apparatus of claim 28, further comprising:

means for receiving an input, from a user associated with the apparatus, that indicates to adjust the center of gravity; and means for adjusting the center of gravity based at least in part on the input from the user of the apparatus.

* * * * *